United States Patent

Murr

[15] 3,677,074
[45] July 18, 1972

[54] TONOMETER PROBE FOR DIGITAL READ-OUT

[72] Inventor: William C. Murr, Piedmont, Calif.

[73] Assignee: Berkeley Bio-Engineering, Inc., Berkeley, Calif.

[22] Filed: Feb. 1, 1971

[21] Appl. No.: 111,367

[52] U.S. Cl. .................................................73/80, 128/2 R
[51] Int. Cl. .........................................................A61b 3/16
[58] Field of Search.................................73/80, 81; 128/2 R

[56] References Cited

UNITED STATES PATENTS

| 1,743,461 | 1/1930 | LaForce | 73/80 |
| 2,882,891 | 4/1959 | Husted | 73/80 X |
| 3,564,907 | 2/1971 | Holcomb et al. | 73/80 |

*Primary Examiner*—Richard C. Queisser
*Assistant Examiner*—C. E. Snee III
*Attorney*—Harris Zimmerman

[57] ABSTRACT

A tonometer probe having two concentric coplanar elements for contact with the surface of an eyeball, the elements being separately displaceable under the influence of applied force and respectively having associated force sensitive transducers for producing electrical signals representative of the applied forces acting on the respective elements. By virtue of the arrangement, the force signal afforded by the annular outer sensing element may be employed to provide information as to when the probe is accurately positioned against the eye and the central sensing element is recording force which is truly representative of that exerted by the internal environment of the eye and which then may be reliably converted to a digital reading for display or for direct input to a computer.

7 Claims, 2 Drawing Figures

PATENTED JUL 18 1972 3,677,074
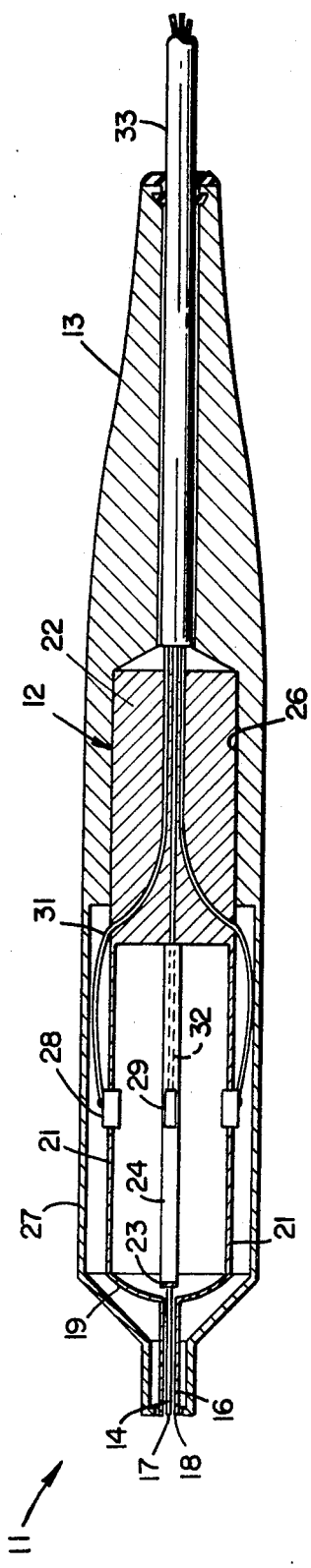
FIG_1
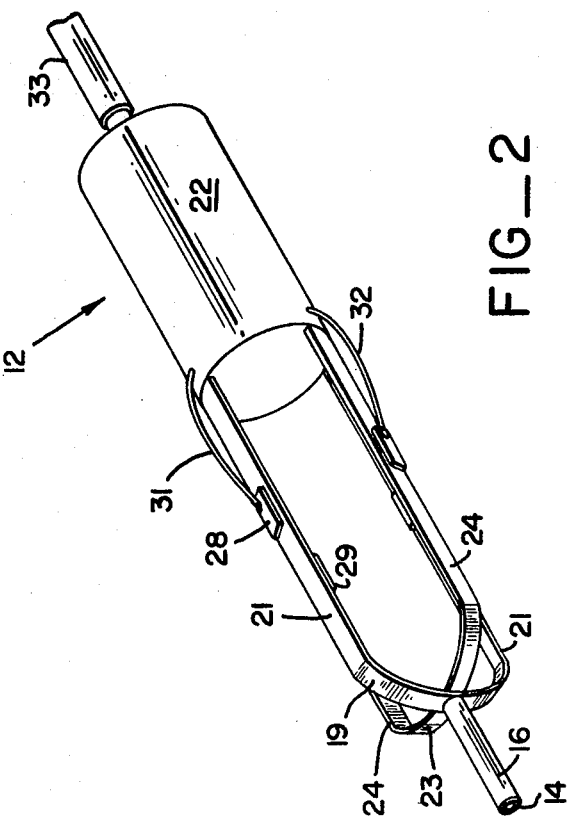
FIG_2
INVENTOR.
WILLIAM C. MURR
BY
*Harris Zimmerman*
ATTORNEY

TONOMETER PROBE FOR DIGITAL READ-OUT

BACKGROUND OF THE INVENTION

Tonometer probes have proven to be valuable instruments in the early detection of glaucoma and other disorders involving increased intraocular pressure of the eye. Typically, such probes have comprised a single force sensitive element of known surface area which is applied with a predetermined force against the cornea. The sensing element facilitates a reading of the force with respect to time such that upon accurate measurement of the area flattened by the sensing element the intraocular pressure may be calculated from the measured force and flattened area. Substantial difficulty has been encountered in the direct precise measurement of the flattened area such that it has become standard practice to determine the precise amount of flattening in an indirect manner. More particularly, the force exerted on the area contacted by the sensing element is continuously recorded on a chart recorder, or the like. A discontinuity in the continuous record of force on the measured area of contact signals that point at which complete flattening has just been exceeded. This approach has proven to be practical and accurate. However, it requires a written analog record of the time variations in force exerted by the eye on the measuring plane area. In this regard, the chart recorder provides a continuous representation of the force signal, and excursions of the pen on the paper may be readily calibrated with accuracy. Unfortunately, a certain amount of equivocality is introduced because of noise in the record from various sources, principally from the inaccuracy and lack of uniformity in probe placement by the operator. Therefore, it has been necessary to examine the written record before an accurate determination of the intraocular pressure can be ascertained therefrom. This necessity for post facto examination of the tonometric record has made simple digital output impossible and has seemingly ruled out the possibility of direct connection of a tonometer to a computer.

SUMMARY OF THE INVENTION

The general object of the present invention is to provide a tonometer probe for facilitating direct digital readout of tonometric information by signalling when the probe has been properly placed against the eye and is sensing force that is truly representative of the intraocular pressure.

In the accomplishment of the foregoing and other objects and advantages, a tonometer probe in accordance with the present invention generally includes concentric inner cylindrical and outer annular sensing elements having coplanar outer end faces for contacting the surface of the eyeball. The elements are separately mounted for individual displacement and are respectively associated with separate force sensitive transducers which generate electrical signals representative of the forces exerted on the plane end areas of the respective elements. The signals may be applied to suitable logic circuitry of associated digital read out apparatus, which circuitry is arranged to determine from the signals whether or not the probe has been applied to the eye within limits of accuracy which will assure that the resulting reading will be reasonably accurately representative of the force exerted by the internal environment of the eye and therefore appropriate for direct digital conversion.

BRIEF DESCRIPTION OF THE DRAWING

FIG. 1 is a side sectional view of a tonometer probe in accordance with the present invention.

FIG. 2 is a perspective view of the core assembly of the probe of FIG. 1.

DETAILED DESCRIPTION OF THE INVENTION

Referring now to the drawing in detail, a tonometer probe 11 in accordance with the present invention will be seen to include a force sensing core assembly 12 mounted within a case 13 which serves to protect the sensitive core and also functions as a handle for the operator to hold during use of the probe. In accordance with the particularly salient aspects of the invention, the core assembly 12 is provided with two independent concentric force sensing elements 14 and 16 having substantially coplanar outer end faces 17 and 18 for application against an eyeball, rather than the usual single sensing element of the prior art. The additional sensing element provides further information which enables the probe to be employed in a manner subsequently described to furnish tonometric information suitable for direct conversion to a digital reading for display or direct input to a computer.

Considering now in more detail the structural arrangement of the core assembly 12, the primary central sensing element 14 is preferably in the form of a cylindrical rod. The secondary outer sensing element 16 is of tubular configuration concentrically disposed about the rod element 14 in closely spaced relation such that the respective elements are independently movable. The tubular element 16 is rigidly secured in coaxially projecting relation to the center of an arcuate bridge strip 19 transversely secured between the ends of a pair of diametrically opposed parallel support members 21 which project longitudinally from a cylindrical body portion 22 of the core. The rod element 14 freely traverses a central aperture in bridge strip 19 and is centrally secured to an arcuate bridge strip 23 disposed rearwardly of bridge strip 19 in right-angular relation thereto. Bridge strip 23 is transversely secured between the ends of a pair of diametrically opposed parallel support members 24 which project longitudinally from body portion 22 at positions of 90° circumferential displacement from support members 21.

The body portion 22 is coaxially secured within an internal cylindrical recess 26 formed in the case 13 and an annular wall 27 of the case is coaxially disposed about the support members 21 and 24 in outwardly spaced relation thereto. The annular wall 27 extends forwardly about the sensing elements 14 and 16 and terminates in coplanar relation to end faces 17 and 18 so as to continue the substantial plane thereto far enough to protect the sensing faces as well as an eye to which they may be applied.

With the probe 11 provided in the manner hereinbefore described, the sensing elements 14 and 16 are freely independently movable and any force on the end faces 17 and 18 causes respective displacements of the associated bridge strips 23 and 19. Such displacements of the bridge strips 23 and 19 in turn effect bending of the support members 24 and 21 respectively in proportion to the forces acting on the inner and outer sensing elements 14 and 16. In order to convert these forces to proportional electrical signals, strain gauge elements 28 are secured to the four sides of each support member 21, and strain gauge elements 29 are similarly secured to the four sides of each support member 24. The strain gauge elements 28 and 29 are in turn connected to separate sets of electrical leads 31 and 32 of a multi-conductor cable 33 which extends coaxially from the rear end of case 13 for connection to the associated read out apparatus (not shown). Thus, the previously noted bending of the support members 21 and 24 creates strain in the strain gauge elements 28 and 29 which provide electrical signals representative of the forces acting on the respective sensing elements 16 and 14. It will be appreciated that various alternative force sensitive transducer arrangements may be associated with the concentric sensing elements 14 and 16 to provide electrical indications of the forces exerted thereon.

In the operation of the tonometer probe 11, the coplanar measuring faces 17 and 18 of the sensing elements 14 and 16 are applied to the surface of the cornea. If the probe is inaccurately applied, the surface of the cornea contacts the annular face 18 of the outer secondary sensing element 16 before contact is made with the face 17 of the central primary element 14. Logic circuitry connected to the strain gauge elements 29 and 28 via the leads of cable 33 receives the signals representative of the forces exerted on the respective sensing elements, and when the force signal from the secondary element occurs prior to that from the primary element, the logic circuitry is effective to gate off the measuring circuitry of the read out apparatus and set an error light or flag. This serves to indicate to the operator that more care must be used in applying the probe so that the central face 17 touches the cornea before the annular face 18. Under the latter circumstances, when the probe is accurately applied, the measuring circuitry is not gated off by the logic circuitry. Rather, the measuring circuitry sums the force signal from the central sensing element 14 until such time as a predetermined level of force is registered from the annular sensing element 16. The occurrence of such predetermined force level may then be employed to effect digital readout of the summed central force from a sample and hold circuit, or the like, included in the measuring circuitry. Thus, in this manner the probe 11 of the present invention facilitates direct digital conversion of the tonometric information.

I claim:

1. A tonometric probe comprising concentric cylindrical inner and tubular outer force sensing elements having coplanar outer end faces for application to the surface of an eyeball, a handle case, means mounting said elements to said case for individual displacement, and force sensitive transducer means operably associated with said inner and outer sensing elements for generating electrical signals responsive to displacements thereof respectively representative of forces acting on said coplanar end faces.

2. A tonometric probe according to claim 1, further defined by said mounting and transducer means comprising a core having a cylindrical body portion with first and second pairs of diametrically opposed support members projecting longitudinally therefrom, first and second bridge strips respectively transversely secured between the free ends of said first and second pairs of support members, said tubular sensing element centrally secured to said first bridge strip in coaxially projecting relation, said cylindrical sensing element freely traversing a central aperture in said first bridge strip and centrally secured to said second bridge strip in coaxially projecting relation, and strain gauge elements secured to said first and second pairs of support members.

3. A tonometric probe according to claim 2, further defined by said second pair of support members being circumferentially displaced 90° from said first pair of support members.

4. A tonometer probe according to claim 2, further defined by four strain gauge elements being secured to the four sides of each of said first and second pairs of support members.

5. A tonometer probe according to claim 2, further defined by said body portion of said core being secured within an internal cylindrical recess of said case, said case having an annular wall disposed in coaxially outwardly spaced relation about said support members, said annular wall extending coaxially forwardly about said sensing elements in outwardly spaced relation thereto and terminating in coplanar relation to said outer end faces thereof.

6. A tonometer probe according to claim 5, further defined by said second pair of support members being circumferentially displaced 90° from said first pair of support members.

7. A tonometer probe according to claim 6, further defined by four strain gauge elements being secured to the four sides of each of said first and second pairs of support members.

* * * * *